(12) United States Patent
Mixter, Jr.

(10) Patent No.: US 7,948,103 B2
(45) Date of Patent: May 24, 2011

(54) METHOD AND SYSTEM FOR VERIFYING WIND TURBINE OPERATION

(75) Inventor: John Robert Mixter, Jr., Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/553,434

(22) Filed: Sep. 3, 2009

(65) Prior Publication Data

US 2010/0133822 A1 Jun. 3, 2010

(51) Int. Cl.
*F03D 9/00* (2006.01)
*H02P 9/04* (2006.01)
*F03B 13/00* (2006.01)

(52) U.S. Cl. ............................... 290/44; 290/54; 290/55

(58) Field of Classification Search .................... 290/44, 290/54, 55
See application file for complete search history.

(56) References Cited

U.S. PATENT DOCUMENTS

| | | | |
|---|---|---|---|
| 5,416,416 A | 5/1995 | Bisher | 324/426 |
| 5,583,440 A | 12/1996 | Bisher | 324/426 |
| 6,739,512 B2 * | 5/2004 | Guerrero et al. | 235/462.01 |
| 6,833,636 B1 | 12/2004 | Nestel et al. | 307/154 |
| 7,099,800 B2 | 8/2006 | Henriksen et al. | 702/187 |
| 7,118,338 B2 * | 10/2006 | Moroz et al. | 416/1 |
| 7,231,282 B2 | 6/2007 | Schubert et al. | 700/287 |
| 7,282,807 B2 | 10/2007 | Hornemann et al. | 290/44 |
| 7,312,537 B1 * | 12/2007 | Walling et al. | 290/44 |
| 7,346,462 B2 * | 3/2008 | Delmerico | 702/60 |
| 7,391,126 B2 * | 6/2008 | Liu et al. | 290/44 |
| 7,417,333 B2 * | 8/2008 | Miller et al. | 290/44 |
| 7,476,987 B2 * | 1/2009 | Chang | 290/55 |
| 7,870,379 B2 * | 1/2011 | Krieger et al. | 713/100 |
| 2002/0029097 A1 | 3/2002 | Pionzio, Jr. et al. | 700/286 |
| 2003/0094493 A1 * | 5/2003 | Guerrero et al. | 235/462.01 |
| 2003/0097315 A1 * | 5/2003 | Guerrero et al. | 705/28 |
| 2006/0002794 A1 * | 1/2006 | Moroz et al. | 416/48 |
| 2006/0140761 A1 | 6/2006 | LeMieux | 416/61 |
| 2007/0228838 A1 * | 10/2007 | Delmerico et al. | 307/84 |
| 2007/0246943 A1 * | 10/2007 | Chang et al. | 290/44 |
| 2008/0106098 A1 * | 5/2008 | Miller et al. | 290/44 |
| 2008/0112807 A1 * | 5/2008 | Uphues et al. | 416/1 |
| 2009/0177333 A1 * | 7/2009 | Delmerico et al. | 700/297 |
| 2009/0259429 A1 * | 10/2009 | Elisiussen | 702/113 |
| 2009/0299697 A1 * | 12/2009 | Hamby et al. | 702/182 |
| 2010/0034652 A1 * | 2/2010 | Battisti | 416/39 |
| 2010/0100249 A1 * | 4/2010 | Molgaard | 700/289 |
| 2010/0110836 A1 * | 5/2010 | Adler et al. | 367/136 |
| 2010/0133818 A1 * | 6/2010 | Kinzie et al. | 290/44 |
| 2010/0135789 A1 * | 6/2010 | Zheng et al. | 416/1 |
| 2010/0135798 A1 * | 6/2010 | Eggleston | 416/36 |
| 2010/0138059 A1 * | 6/2010 | Kumar et al. | 700/287 |
| 2010/0138182 A1 * | 6/2010 | Jammu et al. | 702/113 |
| 2010/0138188 A1 * | 6/2010 | Mengane et al. | 702/182 |
| 2010/0138267 A1 * | 6/2010 | Vittal et al. | 705/8 |

(Continued)

*Primary Examiner* — Pedro J Cuevas
(74) *Attorney, Agent, or Firm* — James McGinness, Esq.; Armstrong Teasdale LLP

(57) ABSTRACT

A wind turbine verification system is described that includes a wind turbine controller having a plurality of wind turbine operating parameters stored therein and a verification device that includes a processor, memory device, and user input mechanism. The verification device is configured to communicatively couple to the wind turbine controller via a data link. The verification device is also configured to receive at least one parameter from the wind turbine controller and execute a verification program on the wind turbine controller, wherein the verification program is configured to iterate through a plurality of predefined tasks. The verification device is configured to verify at least one operating condition of a wind turbine based on the executed verification program.

20 Claims, 5 Drawing Sheets

U.S. PATENT DOCUMENTS

| | | | |
|---|---|---|---|
| 2010/0140938 A1* | 6/2010 | Cook | 290/44 |
| 2010/0143117 A1* | 6/2010 | Xiong | 416/1 |
| 2010/0145641 A1* | 6/2010 | Bose et al. | 702/58 |
| 2010/0308584 A1* | 12/2010 | Coates et al. | 290/44 |
| 2010/0332040 A1* | 12/2010 | Garcia | 700/287 |
| 2011/0012603 A1* | 1/2011 | Bose et al. | 324/418 |

* cited by examiner

METHOD AND SYSTEM FOR VERIFYING WIND TURBINE OPERATION

BACKGROUND OF THE INVENTION

The present application relates generally to wind turbines and, more particularly, to a method and system for verifying wind turbine operation.

Generally, wind turbines are complicated machines that may include a large number of mechanical and electrical components. When a wind turbine is assembled at a site, typically one or more tests are performed to verify proper wind turbine operation. More specifically, often a wind turbine is tested at various stages of assembly before being delivered to a customer. For example, a wind turbine may undergo a pre-commissioning acceptance test (PCAT), a field commissioning acceptance test (FCAT), and a customer commissioning test (CCT). Only after these tests have been completed may the wind turbine be delivered to the customer.

The commissioning tests, PCAT, FCAT, and CCT, may be performed by a wind turbine commissioning technician (also known as a commissioner). In at least some known wind turbine verification systems, the commissioner performs at least one of a PCAT, FCAT, and CCT using a paper copy of commissioning verification procedures. The paper copies of such verification procedures may be large and cumbersome. Often, many of the tests are performed within a nacelle of a wind turbine, where space may be limited. Commissioners may also need to bring other equipment into the wind turbine and/or nacelle. As such, commissioners may not have sufficient room for the voluminous paper copies.

Generally, commissioners must undergo a lengthy training process regarding proper wind turbine verification procedures. Moreover, commissioners may make mistakes in following the wind turbine verification procedures from the paper copy. For example, often the results of the tests are recorded on a paper copy, and transcription errors may occur when such recorded results are transferred into a centralized database or other data repository. Moreover, such transcriptions may be costly and/or time-consuming.

BRIEF DESCRIPTION OF THE INVENTION

In one embodiment, a wind turbine verification system is provided. The system includes a wind turbine controller having a plurality of wind turbine operating parameters stored therein, and a verification device that includes a processor, a memory device, and a user input mechanism. The verification device is configured to communicatively couple to the wind turbine controller via a data link. The verification device is also configured to receive at least one parameter from the wind turbine controller and execute a verification program on the wind turbine controller, wherein the verification program is configured to iterate through a plurality of predefined tasks. The verification device is configured to verify at least one operating condition of a wind turbine based on the executed verification program.

In another embodiment, a method for verifying proper operation of a wind turbine is provided. The method includes providing a wind turbine controller having a plurality of wind turbine operating parameters stored therein, and a verification device having a processor, a memory device, and a user input mechanism. The method includes coupling the wind turbine controller in communication with the verification device via a data link and receiving at least one of the wind turbine operating parameters from the wind turbine controller. The method also includes executing a verification program on the wind turbine controller, wherein the verification program is configured to iterate through a plurality of predefined tasks, and verifying at least one operating condition of the wind turbine based on the executed verification program.

In another embodiment, a verification device for use in verifying wind turbine operation is provided. The device includes a processor, a memory device, and a user input mechanism. The device is configured to communicatively couple, via a data link, to a wind turbine controller having a plurality of wind turbine operating parameters stored therein. The device is also configured to receive at least one parameter from the wind turbine controller and execute a verification program on the wind turbine controller, wherein the verification program is configured to iterate through a plurality of predefined tasks. The verification device is configured to verify at least one operating condition of a wind turbine based on the executed verification program.

DETAILED DESCRIPTION OF THE INVENTION

Figure 1:
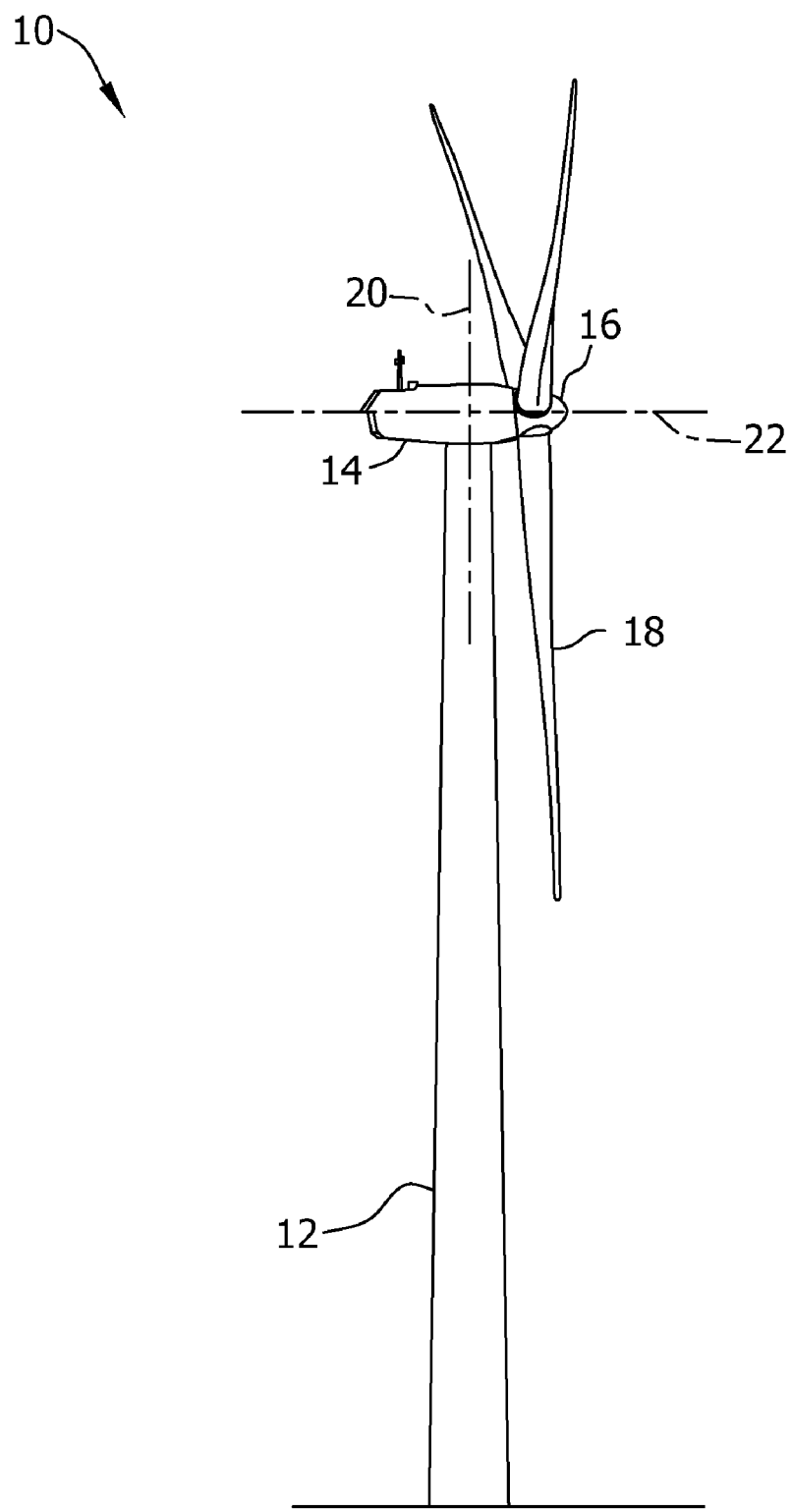
FIG. 1 is a side perspective view of an exemplary wind turbine.

FIG. 1 illustrates an exemplary wind turbine 10. In the exemplary embodiment, wind turbine 10 includes a tower 12, a nacelle 14 that is coupled to tower 12, a hub 16 that is coupled to nacelle 14, and at least one blade 18 that is coupled to hub 16. Tower 12 provides support for nacelle 14, hub 16, and blade 18. Nacelle 14 is coupled to tower 12. Nacelle 14 houses components (not shown) for use in transforming rotational energy of blade 18 into electricity. Nacelle 14 may be constructed as is known in the art. Hub 16 is coupled to nacelle 14. Hub 16 provides a rotatable housing for at least one blade 18. At least one blade 18 is coupled to hub 16. In the exemplary embodiment, three blades 18 are coupled to hub 16. Blades 18 are rotatable about an axis of rotation 22 when wind strikes blades 18. In the exemplary embodiment, each blade 18 is oriented substantially perpendicularly to the ground. Each blade 18 rotates through substantially the same plane of rotation and substantially parallel to a centerline axis 20 of tower 12.

Figure 2:
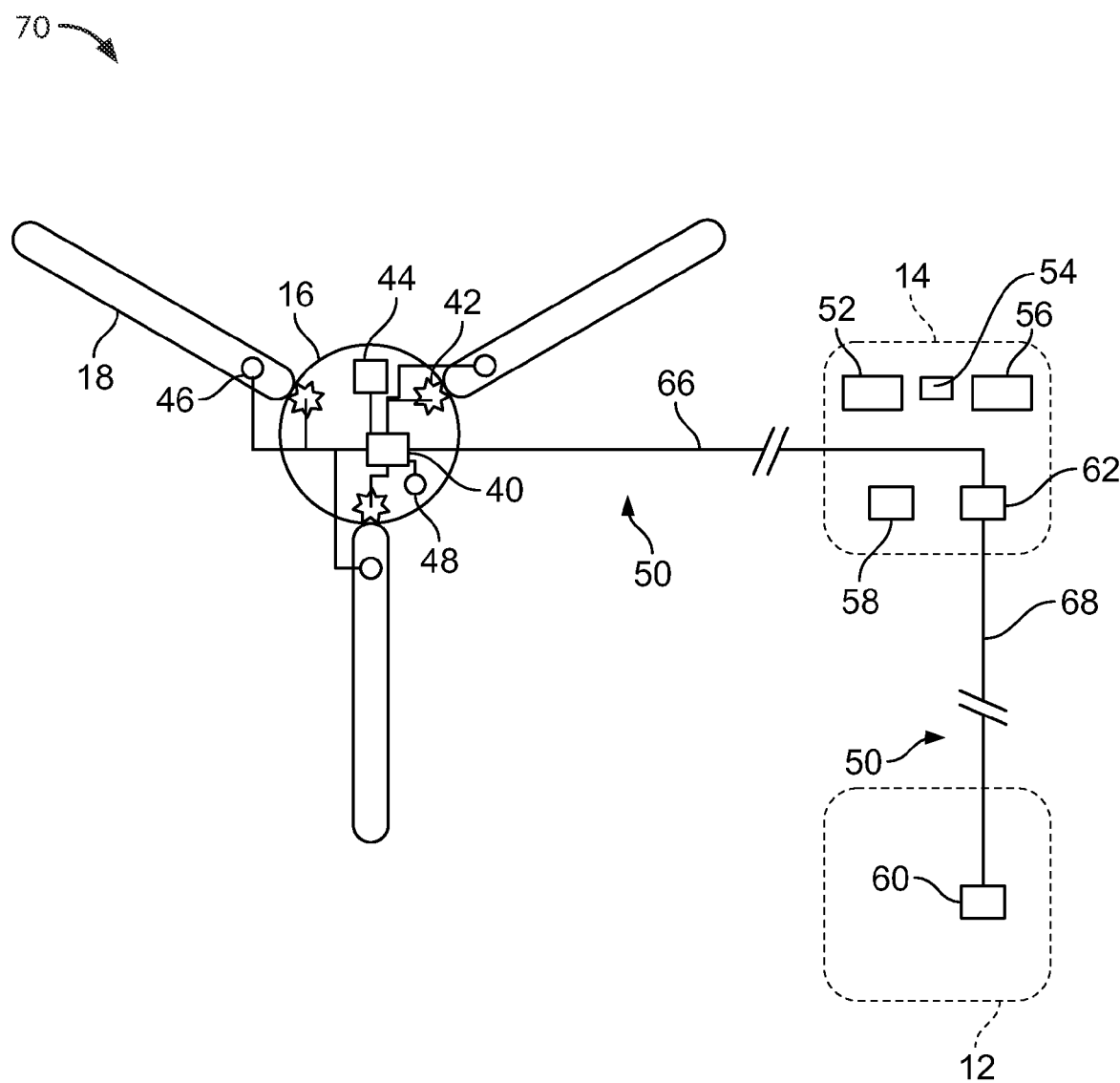
FIG. 2 is a block diagram of an exemplary wind turbine control system that may be used with the wind turbine shown in FIG. 1.

FIG. 2 illustrates a block diagram of an exemplary wind turbine control system 70 that may be used with wind turbine 10 (shown in FIG. 1). Control system 70 is coupled to components within hub 16, blades 18, nacelle 14, and tower 12. In the exemplary embodiment, hub 16 includes a pitch controller 40, at least one pitch drive 42, a hub backup power supply 44, and a hub sensor 48. Pitch controller 40 is coupled to blades 18 through pitch drives 42. In one embodiment, hub 16 includes three pitch drives 42, wherein pitch controller 40 is coupled to each blade 18 via a respective pitch drive 42.

In the exemplary embodiment, pitch controller 40 is located within hub 16 and controls, for example, a pitch angle (not shown) and/or a relative position (not shown) of blades 18. Moreover, pitch controller 40 communicates with a wind turbine controller 60 via a communication network 50. In the exemplary embodiment, pitch controller 40 includes a programmable logic controller (PLC). In an alternative embodiment, pitch controller 40 includes a microprocessor, a microcontroller, a field programmable gate array (FPGA) or any other programmable circuit that enables pitch controller 40 to operate as described herein. As used herein, the term "controls" includes, but is not limited to only including, issuing commands to be implemented by exercising oversight and supervision of, and/or directing operation of, one or more subject components. The term "control" also includes a regulation-type of control, e.g., a feedback-loop regulation.

In the exemplary embodiment, pitch drives 42 receive one or more pitch commands from pitch controller 40, and in response, rotate blades 18 to a desired position and/or pitch angle identified by the pitch commands. Pitch drives 42 may rotate blades 18 using, for example, hydraulic, electric, and/or gear-driven means. In the exemplary embodiment, hub sensor 48 determines a speed of rotation of and/or a load induced to hub 16. Hub backup power supply 44 may include, for example, a battery, a magnetic energy storage device, and/or one or more capacitors. Hub backup power supply 44 provides electrical power to components within hub 16, such as pitch controller 40, pitch drives 42, and hub sensor 48.

In the exemplary embodiment, each blade 18 includes a blade sensor 46 coupled thereto. Each blade sensor 46 is also coupled to pitch controller 40. Blade sensors 46 enable a speed of rotation of and/or a load induced to each blade 18 to be determined.

In the exemplary embodiment, nacelle 14 includes a gearbox 52, a brake 54, a generator 56, a battery 58, and a nacelle controller 62. In an alternative embodiment, nacelle 14 does not include gearbox 52. In another alternative embodiment, nacelle 14 does not include nacelle controller 62. In the exemplary embodiment, gearbox 52 augments the rotation of a main rotor shaft (not shown) driven by the rotation of blades 18, thereby inducing a higher amount of rotational energy to generator 56. Brake 54 may provide emergency stopping power to generator 56 and/or to wind turbine 10 operation in an event of a fault or other error condition. Generator 56 transforms the rotational energy of the main rotor shaft into electrical energy. Generator 56 may be of any suitable type that enables wind turbine 10 to function as described herein. For example, and without limitation, in one embodiment, generator 56 is a wound rotor induction generator, such as a doubly fed induction generator. Battery 58 provides backup electrical power to nacelle 14 and tower 12 components.

Nacelle controller 62 controls the operation of components within nacelle 14, such as gearbox 52, brake 54, generator 56, and/or battery 58. In the exemplary embodiment, nacelle controller 62 is coupled to pitch controller 40 and to wind turbine controller 60 via communication network 50. More specifically, in the exemplary embodiment, nacelle controller 62 is coupled to pitch controller 40 via a nacelle-hub network 66, and to wind turbine controller 60 via a nacelle-tower network 68.

In the exemplary embodiment, wind turbine controller 60 is located within tower 12. In an alternative embodiment, wind turbine controller 60 is located within nacelle 14. Moreover, in the exemplary embodiment, wind turbine controller 60 operates as a master controller of wind turbine 10 and of pitch control system 70, and may include a computer or other processor that is programmed to execute control algorithms. As used herein, the term "processor" includes, without limitation, any programmable system including systems and microcontrollers, reduced instruction set circuits (RISC), application specific integrated circuits (ASIC), programmable logic circuits (PLC), and any other circuit capable of executing the functions described herein. Wind turbine controller 60 may control other controllers of wind turbine 10, such as pitch controller 40, communicate with other wind turbines (not shown) and/or a wind farm management system (not shown), and/or perform error handling and operational optimization. Moreover, wind turbine controller 60 may also execute a SCADA (Supervisory, Control and Data Acquisition) program.

Hub 16 is coupled to nacelle 14 and to tower 12 via communication network 50. Communication network 50 includes nacelle-hub network 66 and nacelle-tower network 68. More specifically, in the exemplary embodiment, hub 16 is coupled to nacelle 14 via nacelle-hub network 66, and nacelle 14 is coupled to tower 12 via nacelle-tower network 68. Moreover, pitch controller 40 is coupled to wind turbine controller 60 via nacelle-hub network 66 and via nacelle-tower network 68. In the exemplary embodiment, nacelle-hub network 66 uses a slip ring connection to transmit signals via a serial communication protocol or another communication protocol, such as broadband over power line (BPL). In an alternative embodiment, nacelle-hub network 66 includes any other connection that enables network 66 to operate as described herein. In the exemplary embodiment, nacelle-tower network 68 includes one or more of such connections as Ethernet LAN, wireless LAN, a Controller Area Network (CAN) bus, fiber optic connection, or any other communication connection (all not shown) that enables nacelle-tower network 68 to operate as described herein.

Figure 3:
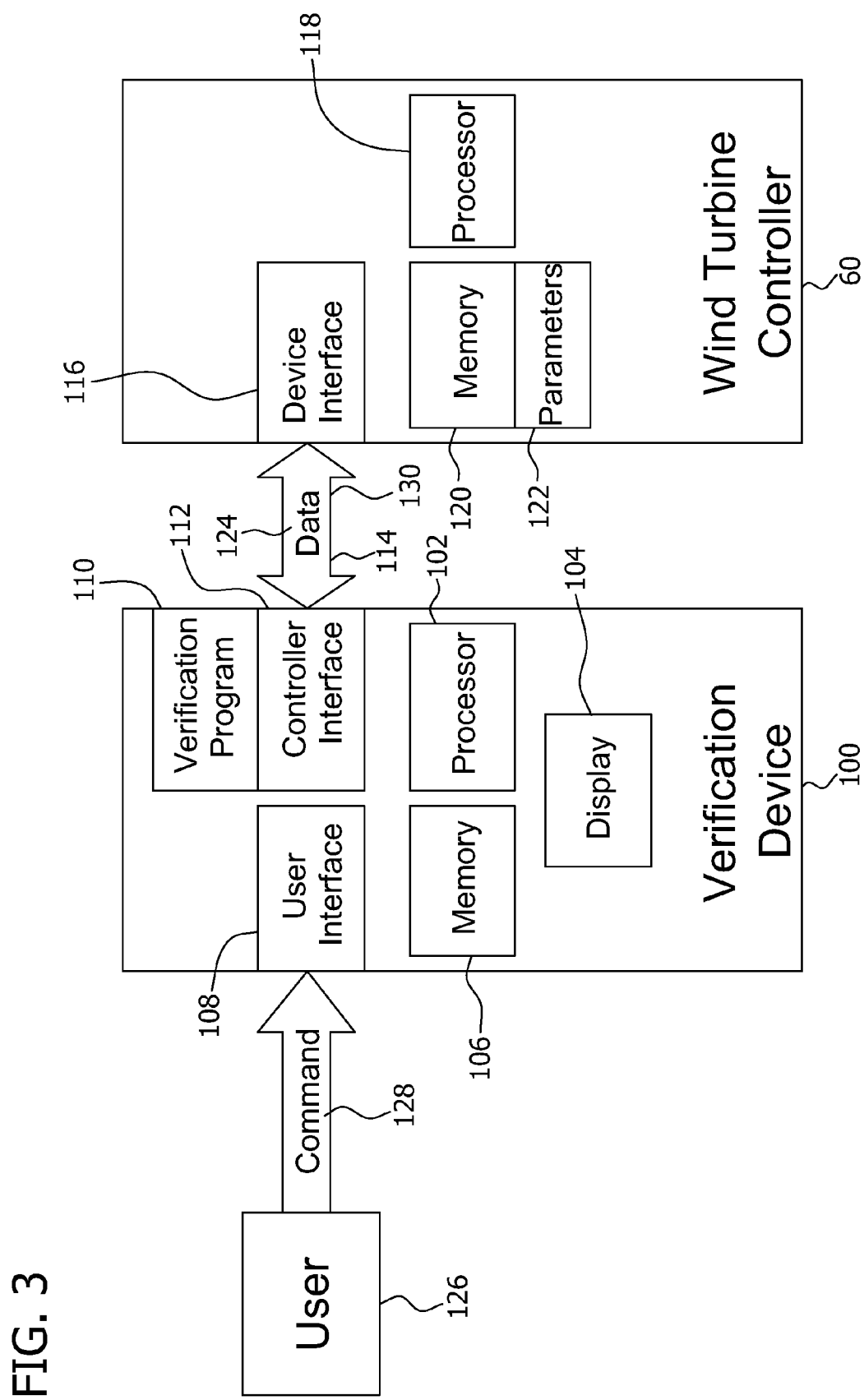
FIG. 3 is a block diagram of an exemplary wind turbine verification device that may be used with the wind turbine control system shown in FIG. 2.

FIG. 3 illustrates a block diagram of an exemplary wind turbine verification device 100 that may be used with wind turbine control system 70 (shown in FIG. 2). In the exemplary embodiment, verification device 100 includes a processor 102 that is coupled to a display 104, a memory 106, and a user interface 108. Verification device 100 also includes a controller interface 112 that is communicatively coupled to wind turbine controller 60 (shown in FIG. 2) via a data link 114. Verification device 100 includes a verification program 110 that receives input from user interface 108 and from controller interface 112 via device processor 102, and that provides output to controller interface 112 and display 104 via device processor 102.

Verification device 100 includes any device that is capable of accessing wind turbine controller 60 and interacting with a user 126 as described herein. For example, verification device 100 may include, without limitation, a laptop computer, a cellular phone, a smart phone, and/or a personal digital assistant (PDA). In the exemplary embodiment, verification device 100 includes a laptop computer. Device processor 102 is coupled to device display 104, to memory 106, and to user interface 108. Device processor 102 is also coupled to controller interface 112 and to data link 114. In the exemplary embodiment, device processor 102 is a microprocessor. In an alternative embodiment, device processor 102 is a programmable logic controller (PLC), a microcontroller, a field programmable gate array (FPGA), and/or any other programmable circuit that enables verification device 100 to operate as described herein.

In the exemplary embodiment, device display 104 is a liquid crystal display (LCD). Alternatively, device display 104 is a cathode ray tube (CRT), a plasma display, or any other type of display that is capable of displaying graphical representations of data and text to a user. Memory 106 may include, without limitation, a hard disk drive, a solid state drive, a diskette, a flash drive, a compact disc, a digital video disc, and/or random access memory (RAM). User interface 108 may include, without limitation, a keyboard, a keypad, a pointing device, a touch sensitive screen, and/or an audio input device. Data link 114 may include, without limitation, an Ethernet cable, a wireless Ethernet connection, a universal serial bus (USB) cable, a serial cable, and/or a parallel cable. A user 126 interacts with verification device 100 by viewing information displayed on device display 104 and manipulating user interface 108 to input at least one user command 128.

Verification program 110 includes at least one software module that communicates with wind turbine controller 60 via device processor 102. In the exemplary embodiment, verification program 110 also includes at least one predefined list of specification data for at least one wind turbine component. For example, the list of specification data may include, without limitation, a maximum rated speed of wind turbine 10, a serial number of wind turbine 10 and/or wind turbine controller 60, and/or a maximum power output of generator 56 (shown in FIG. 2).

In the exemplary embodiment, wind turbine controller 60 includes a verification device interface 116 that is communicatively coupled to verification device 100 via data link 114. Controller 60 also includes a processor 118 and a memory 120 that includes a plurality of wind turbine operating parameters 122. In an alternative embodiment, a plurality of wind turbine operating parameters 122 are stored within a wind turbine component, such as, without limitation, nacelle controller 62 and/or pitch controller 40 (shown in FIG. 2). Controller processor 118 is coupled to verification device interface 116 and to controller memory 120. In the exemplary embodiment, controller processor 118 is a programmable logic controller (PLC). In an alternative embodiment, controller processor 118 is a microprocessor, a microcontroller, a field programmable gate array (FPGA) or any other programmable circuit that enables wind turbine controller 60 to operate as described herein. Controller memory 120 may include, without limitation, a hard disk drive, a solid state drive (SSD), a diskette, a flash drive, a compact disc (CD), a digital video disc (DVD), and/or random access memory (RAM).

During operation, user 126 inputs a user command 128 into verification device 100 via user interface 108. Processor 102 communicates each user command 128 input to the verification program 110 executing on device 100. Device processor 102 utilizes verification program 110 to analyze user command 128 and in response, transmits data 124 representing a device command 130 to wind turbine controller 60 via data link 114 and via device interface 116. Alternatively, upon input of a user command 128, processor 102 transmits data 124 representing a plurality of device commands 130 to wind turbine controller 60 via device interface 116. Upon receipt of a device command 130, controller processor 118 analyzes device command 130 and executes at least one corresponding action. Such an action may include returning data 124 representing one or more wind turbine operating parameters 122 to verification program 110, modifying a parameter 122, and/or modifying an operation of one or more wind turbine components (not shown). For example, such an action may cause controller processor 118 to transmit the device command 130 to another controller within control system 70, such as, nacelle controller 62 or pitch controller 40 (shown in FIG. 2). Moreover, such an action may cause a wind turbine component to be turned on or off, or may cause the modification of the operation of a component. Controller processor 118 may also transmit data 124, representing a status of wind turbine 10 and/or a wind turbine component, to verification program 110. Moreover, controller processor 118 may report a result of device command 130, such as whether device command 130 was implemented successfully, and/or a failure message if the implementation of device command 130 is unsuccessful.

Verification device 100 may be programmed to receive updates to software installed on device 100, such as verification program 110, via an internet connection, via a CD or DVD, via a flash drive (all not shown), and/or via any other suitable software update medium. Moreover, such updates may include, without limitation, an update for verification program 110 as a whole, for one or more software modules or other components of verification program 110, and/or for the list of wind turbine component specification data.

Figure 4:
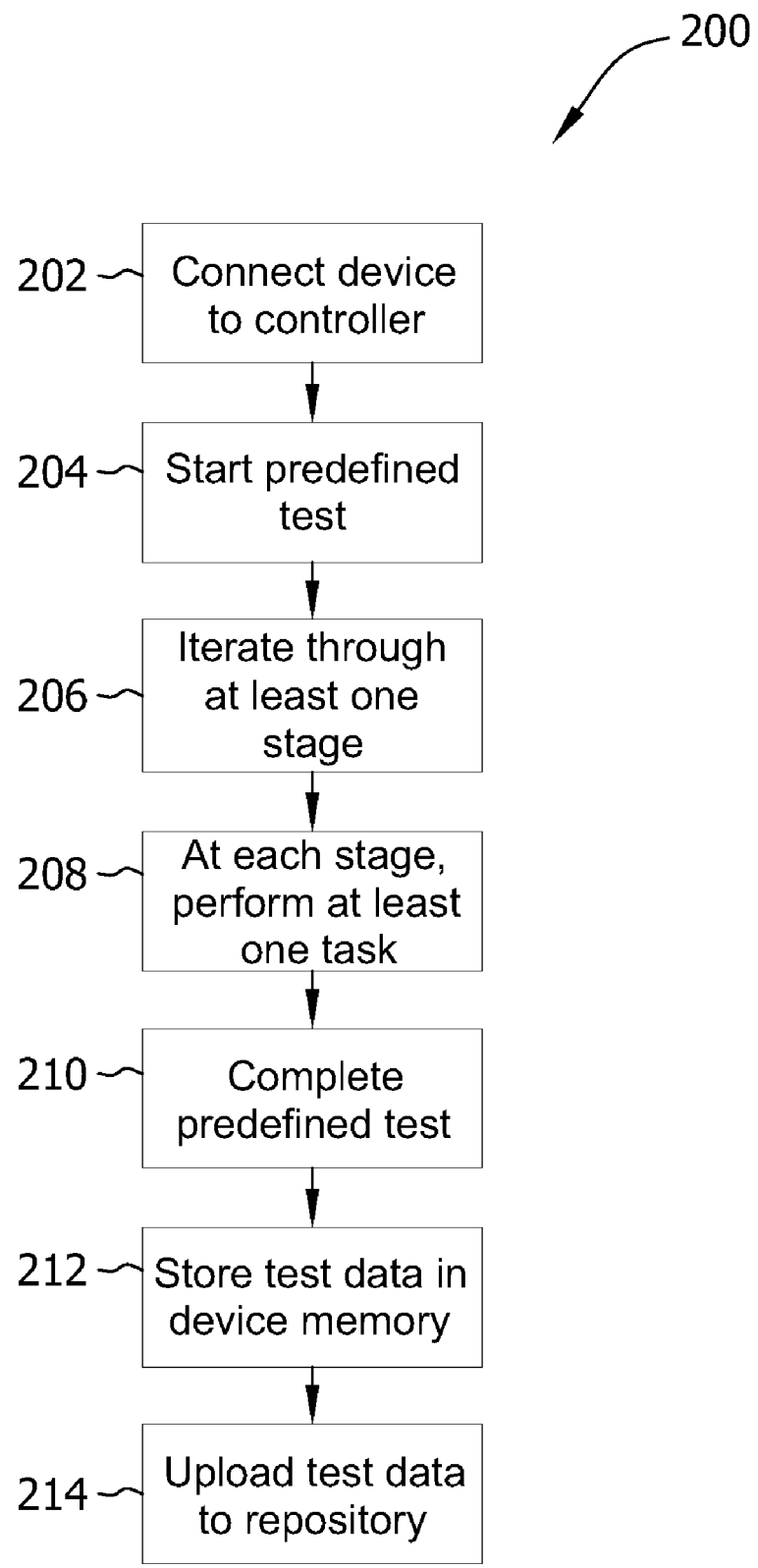
FIG. 4 is a flow diagram of an exemplary method for use in verifying proper operation of a wind turbine, such as may be used with the wind turbine verification device shown in FIG. 3.
Figure 5:
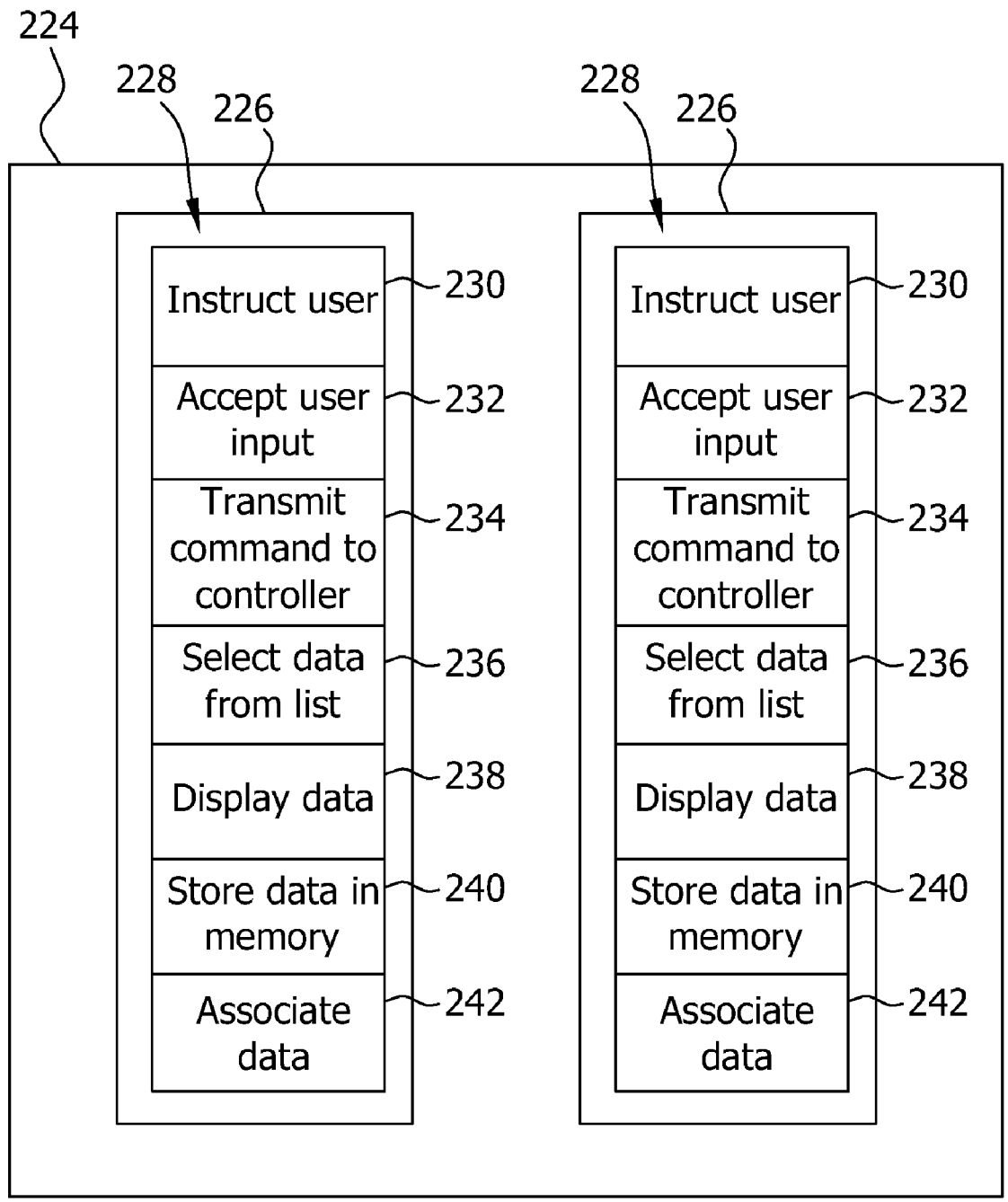
FIG. 5 is a flow diagram of an exemplary predefined test that may be used with the method shown in FIG. 4.

FIG. 4 illustrates a flow diagram of an exemplary method 200 for verifying wind turbine operation that may be used with verification device 100 (shown in FIG. 3). FIG. 5 illustrates a flow diagram of an exemplary predefined test 224 that may be used with method 200 (shown in FIG. 4). In the exemplary embodiment, a user 126 (shown in FIG. 3) connects 202 verification device 100 to wind turbine controller 60 via data link 114 (shown in FIG. 3). In one embodiment, when the connection 202 is completed, verification device 100 and wind turbine controller 60 may engage in a mutual "handshaking" and/or configuration procedure to establish a configuration of a data transfer protocol.

Verification program 110 (shown in FIG. 3) is executed and predefined test 224 is started 204. In one embodiment, verification program 110 includes one predefined test 224, such as, without limitation, a PCAT, an FCAT, or a CCT. In the exemplary embodiment, verification program 110 includes a plurality of predefined tests 224, such as, but not limited to, a PCAT, an FCAT, and/or a CCT, and user 126 selects the desired test 224 to start 204 via user interface 108 (shown in FIG. 3). Test 224 includes at least one predefined test stage 226, and each test stage 226 includes at least one predefined task 228.

In the exemplary embodiment, test 224 iterates 206 through each test stage 226, and performs 208 the tasks 228 included in each stage 226. In the exemplary embodiment, such tasks 228 may include, without limitation, instructing 230 user 126 to perform an identified subtask, accepting 232 input from user 126, transmitting 234 one or more commands to wind turbine controller 60, retrieving or selecting 236 data from a list, displaying 238 data to user 126 via display 104 (shown in FIG. 3), storing 240 data in device memory 106, associating 242 data, and/or any other task 228 defined in test 224.

User 126 may be instructed 230, without limitation, to manually adjust a wind turbine component or to visually inspect a component. Moreover, user 126 may be instructed 230 to refer to documentation or to obtain troubleshooting information to complete a task 228 and/or test stage 226.

User 126 may input data into test 224 (i.e., the test 224 may accept 232 input from user 126) in response to a prompt from test 224. For example and without limitation, user 126 may input data relating to one or more manual adjustments and/or visual inspections of a wind turbine component, or may input data indicating completion of, or failure to complete, a task 228 or subtask. Such data may include, without limitation, notes or comments from user 126, or user commands 128 (shown in FIG. 3). User 126 may also enter their name and/or company information. Alternatively, user 126 may input any other data required by test 224.

In the exemplary embodiment, test 224 transmits 234 one or more commands to controller 60. Such commands may include user commands 128 and/or predefined commands stored in device memory 106 (shown in FIG. 3). Moreover, input of one user command 128 may result in test 224 transmitting 234 a plurality of commands to controller 60. Similarly, a predefined command stored in device memory 106 may cause test 224 to transmit 234 a plurality of commands to controller 60. The commands that test 224 transmits 234 to controller 60 may include, without limitation, requests for data 124 (shown in FIG. 2) from controller 60 and/or other controllers in control system 70 (shown in FIG. 2). Such commands may also include, without limitation, commands to write data 124 to controller 60, to another controller in control system 70, and/or to other wind turbine components. Wind turbine controller 60 may transmit a result of each command sent to wind turbine controller 60, such as whether each command was implemented successfully, and/or may transmit a failure message if the implementation of each command is unsuccessful.

If wind turbine controller 60 reports a failure to implement a command, or if user indicates a failure of a subtask as described above, test 224 indicates a failure and may exit or stop execution. Test 224 may indicate a failure by, without limitation, displaying an error message to user 126, generating an audible alert, and/or exiting. Upon detection of a failure, test 224 also may generate a failure report or log, and may store a record of the failure in device memory 106. The failure record may include, without limitation, the failure report or log, a list of commands transmitted 234 to wind turbine controller 60, a list and/or status of one or more wind turbine operating parameters 122, and/or a record of the test 224, test stage 226, and/or task 228 that was in progress when the failure was detected.

Test 224 may select 236 data from a list, table, or other data structure stored in device memory 106 or controller memory 120 (shown in FIG. 3) to facilitate performing 208 a task 228. For example, and without limitation, test 224 may select 236 data, such as an optimal idle position for blades 18 (shown in FIG. 2), from the predefined list or table of wind turbine component specification data stored in device memory 106. Moreover, test 224 may associate data from the list or table with one or more wind turbine operating parameters 122 received from wind turbine controller 60. For example, and without limitation, test 224 may receive a serial number of wind turbine controller 60 and may, based on that serial number, retrieve a maximum rated speed of wind turbine 10 from the list or table stored in device memory 106 or controller memory 120.

In the exemplary embodiment, test 224 displays 238 data using device display 104 (shown in FIG. 3). For example, and without limitation, test 224 may display 238 a graph of a speed of rotation of blades 18, a pitch speed of blades 18, and/or an output voltage and/or current transmitted from generator 56 (shown in FIG. 2). Moreover, test 224 may display 238 text and/or graphical data to user 126 representing status information and/or one or more results of test 224, test stages 226, and/or tasks 228.

In the exemplary embodiment, test data is stored 240 in device memory 106 for later retrieval. Such test data may include, without limitation, a list of commands transmitted 234 to wind turbine controller 60, a record of test 224, test stages 226, and/or tasks 228 executed, and/or a record of any failures that occurred. Moreover, data may be associated 242 with a test 224, one or more test stages 226, and/or one or more tasks 228. For example, and without limitation, if user 126 enters data representing one or more notes or comments during a particular task 228, test 224 may associate 242 the one or more notes or comments with that task 228. Test 224 may associate 242 such data by, for example, creating a programmatic link between task 228 and the data, or by creating a relation between task 228 and the data in a database. As such, if test 224, test stage 226, and/or task 228 is retrieved later, the associated 242 data will be automatically retrieved as well.

Test 224 is completed 210 after iterating 206 through all test stages 226. In the exemplary embodiment, verification program 110 stores 212 a record of test 224, including any associated 242 test data, in device memory 106. The record of test 224 may be uploaded 214 to a central repository, such as a server. As such, costly and/or time consuming transcription of the record of test 224 may be facilitated to be reduced or eliminated.

A technical effect of the verification system and method described herein includes at least one of (a) providing a wind turbine controller including a plurality of wind turbine operating parameters, and a verification device including a processor, a memory device, and a user input mechanism; (b) coupling a wind turbine controller in communication with a verification device via a data link; (c) receiving at least one wind turbine operating parameter from a wind turbine controller; (d) executing a verification program on a wind turbine controller, wherein the verification program iterates through a plurality of predefined tasks; and (e) verifying at least one operating condition of a wind turbine based on an executed verification program.

The above-described embodiments facilitate providing an efficient and cost-effective method and device for verifying proper wind turbine operation. The verification device facilitates reducing an amount of documentation and other equipment that a technician may be required to use to verify wind turbine operation. Moreover, the verification device facilitates updating test stages, tasks, and/or procedures and promotes maintaining a substantially uniform testing of wind turbines. The verification device facilitates automating repetitive and/or tedious tasks, such as looking up component specifications and transmitting them to a wind turbine controller. Moreover, the verification device facilitates uploading test results and technician notes to a centralized database or other repository.

Exemplary embodiments of a method, system, and device for verifying wind turbine operation are described above in detail. The method, system, and device are not limited to the specific embodiments described herein, but rather, components of the system and device and/or steps of the method may be utilized independently and separately from other components and/or steps described herein. For example, the verification device may also be used in combination with other verification systems and methods, and is not limited to practice with only the wind turbine system as described herein. Rather, the exemplary embodiment can be implemented and utilized in connection with many other power system applications.

The exemplary embodiment may be used to verify operation of generators separate from wind turbine generators. For example, the exemplary embodiment may be used to verify operation of one or more solar power system generators. Moreover, the exemplary embodiment may be used to verify operation of one or more generators in other renewable energy power systems, or in any other power system.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine verification system, said system comprising:
   a wind turbine controller comprising a first processor and a first memory device having a plurality of wind turbine operating parameters stored therein; and,
   a verification device comprising a second processor, a second memory device, and a user input mechanism, said verification device being configured to communicatively couple to said wind turbine controller via a data link, said verification device being programmed to:
      receive at least one wind turbine operating parameter from said wind turbine controller;
      execute a verification program that transmits at least one command to said wind turbine controller, wherein the verification program comprises at least one test that, when executed, iterates through a plurality of predefined tasks; and,
      verify at least one operating condition of a wind turbine based on the executed verification program.

2. A wind turbine verification system in accordance with claim 1, wherein said verification device is further configured to enable a user to electronically input text into said interface device via said user input mechanism, wherein the text is stored in said second memory device.

3. A wind turbine verification system in accordance with claim 1, wherein said verification device further comprises a display that is coupled to said second processor, said verification device further configured to generate a graphical representation of at least one of the wind turbine operating parameters on said display.

4. A wind turbine verification system in accordance with claim 1, wherein said verification device is configured to transmit a plurality of commands to said wind turbine controller when a user enters at least one command via said user input mechanism.

5. A wind turbine verification system in accordance with claim 1, wherein said verification device comprises a plurality of wind turbine component specifications stored in said second memory device.

6. A wind turbine verification system in accordance with claim 1, wherein said verification device is further configured to determine a failure of said verification program.

7. A wind turbine verification system in accordance with claim 6, wherein said verification device is further configured to:
   create a record of the failure of the verification program; and,
   store the record in said second memory device.

8. A method for verifying proper operation of a wind turbine, said method comprising:
   providing a wind turbine controller including a first processor and a first memory device having a plurality of wind turbine operating parameters stored therein, and a verification device including a second processor, a second memory device, and a user input mechanism;
   coupling the wind turbine controller in communication with the verification device via a data link;
   receiving at least one wind turbine operating parameter from the wind turbine controller;
   executing a verification program that transmits at least one command to the wind turbine controller, wherein the verification program includes at least one test that, when executed, iterates through a plurality of predefined tasks; and,
   verifying at least one operating condition of the wind turbine based on the executed verification program.

9. A method in accordance with claim 8, wherein said method further comprises enabling a user to electronically input text into the interface device via the user input mechanism.

10. A method in accordance with claim 8, wherein the verification device includes a display that is coupled to the second processor, said method further comprises generating a graphical representation of at least one of the wind turbine operating parameters on the display.

11. A method in accordance with claim 8, wherein said method further comprises transmitting a plurality of commands to the wind turbine controller when a user enters at least one command via the user input mechanism.

12. A method in accordance with claim 8, wherein said method further comprises storing a plurality of wind turbine component specifications in the second memory device.

13. A method in accordance with claim 8, wherein said method further comprises determining a failure of the verification program.

14. A method in accordance with claim 13, wherein said method further comprises:
   creating a record of the failure of the verification program; and,
   storing the record in the second memory device.

15. A verification device for use in verifying generator operation, said verification device comprising:
   a first processor, a first memory device, and a user input mechanism, said verification device being configured to communicatively couple, via a data link, to a generator controller including a second processor and a second memory device having a plurality of generator operating parameters stored therein, said verification device being programmed to:
      receive at least one generator operating parameter from the generator controller;
      execute a verification program that transmits at least one command to the generator controller, wherein the verification program comprises at least one test that, when executed, iterates through a plurality of predefined tasks; and,
      verify at least one operating condition of a generator based on the executed verification program.

16. A verification device in accordance with claim 15, wherein said verification device is further configured to enable a user to electronically input text into said interface device via said user input mechanism, wherein the text is stored in said first memory device.

17. A verification device in accordance with claim 15, wherein said verification device further comprises a display that is coupled to said first processor, said verification device further configured to generate a graphical representation of at least one of the generator operating parameters on said display.

18. A verification device in accordance with claim 15, wherein said verification device is configured to transmit a plurality of commands to the generator controller when a user enters at least one command via said user input mechanism.

19. A verification device in accordance with claim 15, wherein said verification device comprises a plurality of generator component specifications stored in said first memory device.

20. A verification device in accordance with claim 15, wherein said verification device is further configured to determine a failure of the verification program.

* * * * *

UNITED STATES PATENT AND TRADEMARK OFFICE
Certificate

Patent No. 7,948,103 B2                                                                                     Patented: May 24, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John Robert Mixter, Jr., Salem, VA (US); David Coulson Kennedy, Roanoake, VA (US); and Pooja Verma, Greenville, SC (US).

Signed and Sealed this Nineteenth Day of February 2013.

<div style="text-align:right">

RENEE LUEBKE
*Supervisory Patent Examiner*
Art Unit 2833
Technology Center 2800

</div>